United States Patent
Vjunov et al.

(10) Patent No.: US 12,253,015 B2
(45) Date of Patent: Mar. 18, 2025

(54) CATALYTIC ARTICLE AND METHODS OF MANUFACTURING AND USING THE SAME

(71) Applicant: BASF MOBILE EMISSIONS CATALYSTS LLC, Iselin, NJ (US)

(72) Inventors: Aleksei Vjunov, Iselin, NJ (US); Michel Deeba, East Brunswick, NJ (US); Xiaolai Zheng, Iselin, NJ (US); Tian Luo, Iselin, NJ (US)

(73) Assignee: BASF Mobile Emissions Catalysts LLC, Iselin, NJ (US)

( * ) Notice: Subject to any disclaimer, the term of this patent is extended or adjusted under 35 U.S.C. 154(b) by 795 days.

(21) Appl. No.: 17/309,711

(22) PCT Filed: Dec. 16, 2019

(86) PCT No.: PCT/IB2019/060847
§ 371 (c)(1),
(2) Date: Jun. 16, 2021

(87) PCT Pub. No.: WO2020/128785
PCT Pub. Date: Jun. 25, 2020

(65) Prior Publication Data
US 2022/0025796 A1    Jan. 27, 2022

Related U.S. Application Data

(60) Provisional application No. 62/781,630, filed on Dec. 19, 2018.

(30) Foreign Application Priority Data

Jan. 16, 2019  (EP) ..................... 19152014

(51) Int. Cl.
*F01N 3/10*    (2006.01)
*B01J 23/44*    (2006.01)
(Continued)

(52) U.S. Cl.
CPC .............. *F01N 3/101* (2013.01); *B01J 23/44* (2013.01); *B01J 23/464* (2013.01); *B01J 23/72* (2013.01);
(Continued)

(58) Field of Classification Search
CPC ......... F01N 3/101; B01J 23/44; B01J 23/464; B01J 23/72; B01J 23/755; B01J 35/19
See application file for complete search history.

(56) References Cited

U.S. PATENT DOCUMENTS 4,171,288 A * 10/1979 Keith .................... B01J 23/6567
  502/332
9,901,892 B2 * 2/2018 Guo ......................... B01J 23/26
(Continued)

FOREIGN PATENT DOCUMENTS

WO    WO-03035256 A2 *  5/2003 ........... B01D 53/865
WO    WO-2015/187664 A1   12/2015
(Continued)

OTHER PUBLICATIONS

International Search Report dated May 4, 2020, PCT/IB2019/060847.
(Continued)

*Primary Examiner* — Jun Li
(74) *Attorney, Agent, or Firm* — DLA Piper LLP (US)

(57) ABSTRACT

The present invention provides a catalytic article comprising a) a first layer comprising a nickel component and a copper component supported on a ceria component, wherein the amount of the nickel component is 0.1 to 30 wt. %, calculated as nickel oxide, based on the total weight of the first layer, and wherein the amount of the copper component is 0.01 to 5.0 wt. % calculated as copper oxide, based on the total weight of the first layer; b) a second layer comprising a platinum group metal component supported on at least one
(Continued)

of an oxygen storage component, an alumina component and a zirconia component, wherein the platinum group metal component comprises platinum, rhodium, palladium, or any combination thereof, and wherein the amount of the platinum group metal component is 0.01 to 5.0 wt. % based on the total weight of the second layer; and c) a substrate, wherein the first layer and the second layer are separated by a barrier layer or a gap.

24 Claims, 10 Drawing Sheets

(51) Int. Cl.
  *B01J 23/46* (2006.01)
  *B01J 23/72* (2006.01)
  *B01J 23/755* (2006.01)
  *B01J 23/78* (2006.01)
  *B01J 23/89* (2006.01)
  *B01J 35/00* (2006.01)
  *B01J 35/30* (2024.01)
  *B01J 37/02* (2006.01)
  *B01J 37/08* (2006.01)
  *F01N 3/28* (2006.01)
  B01J 21/04 (2006.01)
  B01J 21/06 (2006.01)
  B01J 23/10 (2006.01)

(52) U.S. Cl.
  CPC ............ *B01J 23/755* (2013.01); *B01J 23/78* (2013.01); *B01J 23/894* (2013.01); *B01J 35/19* (2024.01); *B01J 35/396* (2024.01); *B01J 37/0244* (2013.01); *B01J 37/08* (2013.01); *F01N 3/2825* (2013.01); *B01J 21/04* (2013.01); *B01J 21/066* (2013.01); *B01J 23/10* (2013.01); *F01N 2250/02* (2013.01); *F01N 2510/0684* (2013.01)

(56) References Cited

U.S. PATENT DOCUMENTS

| | | |
|---|---|---|
| 2003/0115859 A1 | 6/2003 | Deeba |
| 2007/0116870 A1 | 5/2007 | Dettling et al. |
| 2009/0266063 A1 | 10/2009 | Gandhi et al. |
| 2013/0142713 A1* | 6/2013 | Ifrah .................... C01G 25/00 423/213.2 |
| 2013/0202508 A1 | 8/2013 | Hepburn et al. |
| 2014/0322114 A1 | 10/2014 | Jen et al. |
| 2015/0352493 A1* | 12/2015 | Zhang .................... B01J 23/10 423/213.5 |
| 2016/0158699 A1 | 6/2016 | Cavataio et al. |
| 2018/0333677 A1 | 11/2018 | Shacklady-McAtee et al. |
| 2020/0032690 A1* | 1/2020 | Hengst ................ F01N 13/009 |
| 2022/0055021 A1* | 2/2022 | Liu ...................... F01N 3/2803 |

FOREIGN PATENT DOCUMENTS

| | | | | |
|---|---|---|---|---|
| WO | WO-2017103040 A1 * | 6/2017 | ......... | B01D 53/9418 |
| WO | WO-2018149829 A1 * | 8/2018 | ........... | B01D 53/944 |

OTHER PUBLICATIONS

European Search Report for EP Patent Application No. 19152014.7, Issued on Jul. 2, 2019, 3 pages.

Heck, et al., "Chapter 2—The Preparation of Catalytic Materials: Carriers, Active, Components, and Monolithic Substrates", Catalytic Air Pollution Control: Commercial Technology, 2nd Edition, 2002, pp. 18-19.

* cited by examiner

| Rh, OSC, Al$_2$O$_3$, BaO |
|---|
| Cordierite |

Catalyst 2

| Rh, OSC, Al$_2$O$_3$, BaO |
|---|
| Cu, Ni, CeO$_2$, La$_2$O$_3$, ZrO$_2$ |
| Cordierite |

Catalyst 3

| Rh, OSC, Al$_2$O$_3$, BaO |
|---|
| Al$_2$O$_3$ |
| Cu, Ni, CeO$_2$, La$_2$O$_3$, ZrO$_2$ |
| Cordierite |

Catalyst 4

| Rh, OSC, Al$_2$O$_3$, BaO | Cu, Ni, CeO$_2$, La$_2$O$_3$, ZrO$_2$ |
|---|---|
| Cordierite ||

Catalyst 5 (Zoned)

CATALYTIC ARTICLE AND METHODS OF MANUFACTURING AND USING THE SAME

This application is a U.S. national stage entry application under 35 U.S.C. § 371 from PCT International Application No. PCT/IB2019/060847, filed on Dec. 16, 2019, which claims priority to E.P. Patent Application No. 19152014.7, filed on Jan. 16, 2019, and U.S. Provisional Patent Application No. 62/781,630, filed on Dec. 19, 2018; the contents of each application is incorporated herein by reference in its entirety.

FIELD OF THE DISCLOSURE

The presently claimed invention relates to a catalytic article useful for the treatment of the exhaust gases to reduce pollutants contained therein. Particularly, the presently claimed invention relates to the catalytic article comprising a platinum group metal and a non-platinum group metal to reduce carbon monoxide emission, nitrogen oxide emission and hydrocarbon emission.

BACKGROUND

The catalysts such as three-way conversion (TWC) catalysts are well known in the automobile industry for reducing the pollutants such as hydrocarbons (HC), carbon monoxide (CO), and nitrogen oxides ($NO_x$) from the engine exhaust gases. These TWC catalysts typically contain platinum group metal (PGM) such as platinum, palladium, rhodium and combinations thereof which functions to stimulate the oxidation reaction of HC and CO and the reduction of $NO_x$.

In recent years, government regulations of various countries, such as USA, have placed strict restrictions on emission of carbon monoxide, i.e. the acceptable values for CO emission from the tailpipe are steadily decreasing. Thus, an improved catalyst technology is needed to meet the strict standards. Some of prior arts disclosed use of a three-way catalyst comprising nickel or a combination of nickel and copper to reduce pollutants. These catalysts comprise alumina impregnated with nickel or copper. However, these catalysts are not commercially successful as both nickel and copper can react with alumina to form nickel-aluminate and copper-aluminate. The formation of the respective aluminate typically occurs during the severe aging conditions which may cause deactivation of the catalyst.

Further, it is also found that these catalysts lack desired efficiency for oxidizing HC and CO and reducing $NO_x$ as the presence of base metal may cause poisoning of PGM and have low thermal stability. Accordingly, it is desired to develop a catalyst containing nickel, copper and platinum group metal using specific carrier(s) and arrangement which can provide significant reduction of carbon monoxide while simultaneously reducing the HC and $NO_x$ emissions levels in order to meet the increasingly stringent regulations.

SUMMARY OF THE DISCLOSURE

The invention claimed here in one aspect provides a catalytic article comprising a) a first layer comprising a nickel component and a copper component supported on a ceria component, wherein the amount of the nickel component is 0.1 to 30 wt. %, calculated as nickel oxide, based on the total weight of the first layer, and wherein the amount of the copper component is 0.01 to 5 wt. % calculated as copper oxide, based on the total weight of the first layer; b) a second layer comprising a platinum group metal component supported on at least one of an oxygen storage component, an alumina component and a zirconia component, wherein the platinum group metal component comprises platinum, rhodium, palladium, or any combination thereof, and wherein the amount of the platinum group metal component is 0.01 to 5 wt. % based on the total weight of the second layer; and c) a substrate, wherein the first layer and the second layer are separated by a barrier layer or a gap of 1 mm to 10 mm.

In another aspect, the presently claimed invention also provides a process for the preparation of a catalytic article. In one embodiment, the process comprises preparing a first layer slurry; depositing the first layer slurry on a substrate to obtain a first layer; preparing a barrier layer slurry and depositing the barrier layer slurry as a middle layer on the first layer; preparing a second layer slurry; and depositing the second layer slurry on the middle layer to obtain a second layer followed by calcination at a temperature ranging from 400 to 700° C., wherein the step of preparing the first layer slurry or second layer slurry comprises a technique selected from incipient wetness impregnation, incipient wetness co-impregnation, and post-addition.

In still another aspect, the presently claimed invention provides an exhaust system for internal combustion engines, said system comprising i) a catalytic article of the present invention; and ii) optionally, a platinum-group-metal-based three-way conversion (TWC) catalytic article comprising 1 to 300 g/ft³ of a platinum group metal selected from platinum, palladium, rhodium and combinations thereof.

In yet another aspect, the presently claimed invention provides a method of treating a gaseous exhaust stream comprising hydrocarbons, carbon monoxide, and nitrogen oxides, the method comprising contacting the exhaust stream with a catalytic article or an exhaust system of the present invention.

In a further aspect, the presently claimed invention provides a method of reducing hydrocarbons, carbon monoxide, and nitrogen oxides levels in a gaseous exhaust stream, the method comprising contacting the gaseous exhaust stream with a catalytic article or an exhaust system to reduce the levels of hydrocarbons, carbon monoxide, and nitrogen oxide in the exhaust gas.

In another aspect, the presently claimed invention provides use of the catalytic article of the present invention for purifying a gaseous exhaust stream comprising hydrocarbons, carbon monoxide, and nitrogen oxides.

BRIEF DESCRIPTION OF THE DRAWINGS

In order to provide an understanding of embodiments of the invention, reference is made to the appended drawings, which are not necessarily drawn to scale, and in which reference numerals refer to components of exemplary embodiments of the invention. The drawings are exemplary only and should not be construed as limiting the invention. The above and other features of the presently claimed invention, their nature, and various advantages will become more apparent upon consideration of the following detailed description, taken in conjunction with the accompanying drawings:

FIG. 1 is a schematic representation of catalytic article designs in exemplary configurations according to some embodiments of the presently claimed invention.

DETAILED DESCRIPTION OF THE DISCLOSURE

Figure 2:
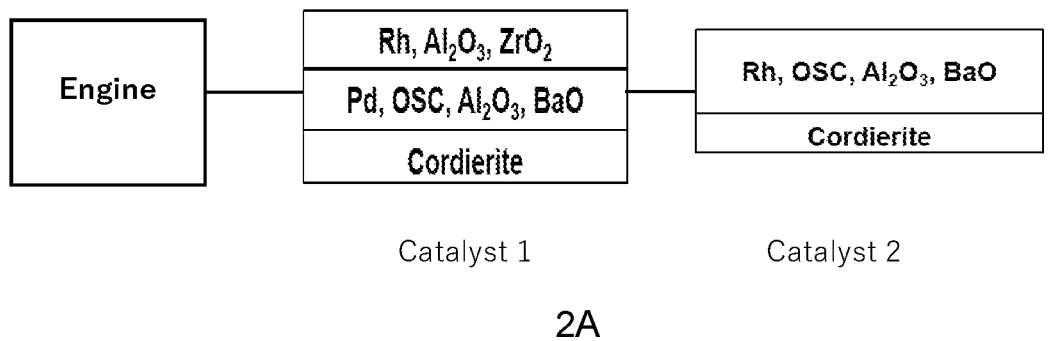
FIG. 2 is a schematic representation of exhaust systems in accordance with some embodiments of the presently claimed invention.
Figure 2:
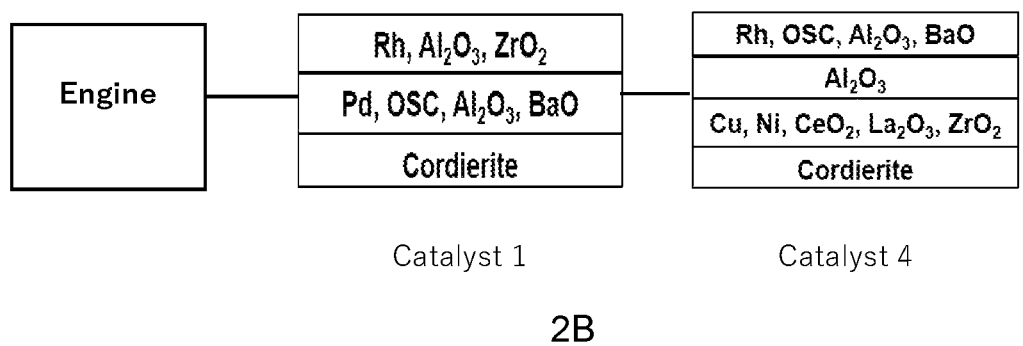
Figure 2:
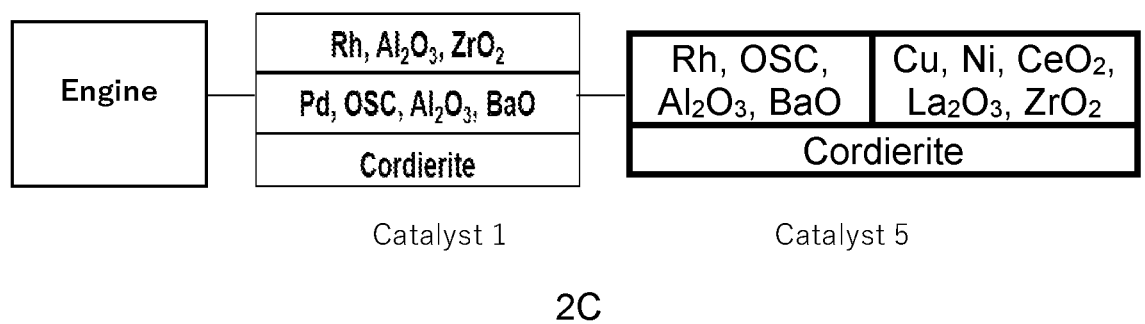

The presently claimed invention now will be described more fully hereafter. The presently claimed invention may be embodied in many different forms and should not be construed as limited to the embodiments set forth herein; rather, these embodiments are provided so that this presently claimed invention will be thorough and complete, and will fully convey the scope of the invention to those skilled in the art. No language in the specification should be construed as indicating any non-claimed element as essential to the practice of the disclosed materials and methods.

The use of the terms "a", "an", "the", and similar referents in the context of describing the materials and methods discussed herein (especially in the context of the following claims) are to be construed to cover both the singular and the plural, unless otherwise indicated herein or clearly contradicted by context.

All methods described herein can be performed in any suitable order unless otherwise indicated herein or otherwise clearly contradicted by context. The use of any and all examples, or exemplary language (e.g., "such as") provided herein, is intended merely to better illustrate the materials and methods and does not pose a limitation on the scope unless otherwise claimed.

As used herein, the term "catalyst" or "catalyst composition" refers to a material that promotes a reaction.

The term "catalytic article" or "catalyst article" refers to a component in which a substrate is coated with catalyst composition which is used to promote a desired reaction. In one embodiment, the catalytic article is a layered catalytic article. The term layered catalytic article refers to a catalytic article in which a substrate is coated with a PGM and/or non-PGM composition(s) in a layered fashion. These composition(s) may be referred to as washcoat(s).

The term "$NO_x$" refers to nitrogen oxide compounds, such as NO and/or $NO_2$.

As used herein, "non-PGM metals" refers to active metals or metal oxides which include, but are not limited to, Ni, Cu, Fe, Mn, Zn and any mixture thereof.

The platinum group metal (PGM) component refers to any component that includes a PGM (Rh, Pd, and Pt). For example, the PGM may be in a metallic form, with zero valence, or the PGM may be in an oxide form. Reference to "PGM component" allows for the presence of the PGM in any valence state. The terms "platinum (Pt) component," "rhodium (Rh) component," "palladium (Pd) component," and the like refer to the respective platinum group metal compound, complex, or the like which, upon calcination or use of the catalyst, decomposes or otherwise converts to a catalytically active form, usually the metal or the metal oxide. The platinum group metal(s) is supported or impregnated on a support material such as an alumina component, an oxygen storage component and a zirconia component. As used herein, "impregnated" or "impregnation" refers to permeation of the catalytic material into the porous structure of the support material.

A "support" in a catalytic material or catalyst composition or catalyst washcoat refers to a material that receives metals (e.g., PGMs), stabilizers, promoters, binders, and the like through precipitation, association, dispersion, impregnation, or other suitable methods. Exemplary supports include refractory metal oxide supports as described herein below.

"Refractory metal oxide supports" are metal oxides including, for example, bulk alumina, ceria, zirconia, titania, silica, magnesia, neodymia, and other materials known for such use, as well as physical mixtures or chemical combinations thereof, including atomically-doped combinations and including high surface area or activated compounds such as activated alumina.

Exemplary combinations of metal oxides include alumina-zirconia, alumina-ceria-zirconia, lanthana-alumina, lanthana-zirconia-alumina, baria-alumina, baric-lanthana-alumina, baria-lanthana-neodymia-alumina, and alumina-ceria. Exemplary aluminas include large pore boehmite, gamma-alumina, and delta/theta alumina. Useful commercial aluminas used as starting materials in exemplary processes include activated aluminas, such as high bulk density gamma-alumina, low or medium bulk density large pore gamma-alumina, and low bulk density large pore boehmite and gamma-alumina. Such materials are generally considered as providing durability to the resulting catalyst.

"High surface area refractory metal oxide supports" refer specifically to support particles having pores larger than 20 Å and a wide pore distribution. High surface area refractory metal oxide supports, e.g., alumina support materials, also referred to as "gamma alumina" or "activated alumina," typically exhibit a BET surface area of fresh material in excess of 60 square meters per gram ("$m^2/g$"), often up to 300 $m^2/g$ or higher. Such activated alumina is usually a mixture of the gamma and delta phases of alumina, but may also contain substantial amounts of eta, kappa and theta alumina phases. "BET surface area" has its usual meaning of referring to the Brunauer-Emmett-Teller method for determining surface area by $N_2$-adsorption measurements. Unless otherwise specifically stated, all references herein to the "specific surface area" or "surface area" refer to the BET surface area.

As used herein, the term "oxygen storage component" (OSC) refers to an entity that has a multi-valence state and can actively react with reductants such as carbon monoxide (CO) and/or hydrogen under reduction conditions and then react with oxidants such as oxygen or nitrogen oxides under oxidative conditions. Examples of oxygen storage components include ceria composites optionally doped with early transition metal oxides, particularly zirconia, lanthana, praseodymia, neodymia, niobia, europia, samaria, ytterbia, yttria, and mixtures thereof.

The terms "exhaust stream", "engine exhaust stream", "exhaust gas stream", and the like refer to any combination of flowing engine effluent gas that may also contain solid or liquid particulate matter. The stream comprises gaseous components and is, for example, exhaust of a lean burn engine, which may contain certain non-gaseous components such as liquid droplets, solid particulates and the like. An exhaust stream of a lean burn engine typically further comprises combustion products, products of incomplete combustion, oxides of nitrogen, combustible and/or carbonaceous particulate matter (soot) and un-reacted oxygen and/or nitrogen. Such terms also refer to the effluent downstream of one or more other catalyst system components as described herein.

The present invention is focused on providing a catalytic article and an exhaust system that can significantly reduce carbon monoxide while simultaneously reducing HC and $NO_x$ emissions levels of the exhaust gas in order to meet the increasingly stringent regulations. The present invention is based on combining highly efficient precious metals such as PGM and low cost of non-PGM metals such as nickel and copper in a specific manner using specific carriers.

It is believed that copper and nickel combination provide enhanced CO and HC conversion and offers more oxygen-storage capacity compared to only PGM based three-way conversion catalysts. Further, the combination of Cu—Ni post depletion of oxygen storage capacity, may further provide carbon monoxide and/or hydrocarbons reduction via catalytic water gas-shift (WGS) and steam-reforming reactions. That is, the nickel-copper catalyst can catalyse the reaction of water with carbon monoxide or the reaction of water with hydrocarbons to form carbon dioxide and hydrogen in the engine exhaust during extended rich conditions. The combination is found to be even effective at low temperature to expedite the reaction thus, provides enhanced efficacy to reduce carbon monoxide, hydrocarbons, and nitrogen oxides.

Accordingly, the presently claimed invention provides a catalytic article comprising a) a first layer comprising a nickel component and a copper component supported on a ceria component, wherein the amount of the nickel component is 0.1 to 30 wt. %, calculated as nickel oxide, based on the total weight of the first layer, and wherein the amount of the copper component is 0.01 to 5.0 wt. % calculated as copper oxide, based on the total weight of the first layer; b) a second layer comprising a platinum group metal component supported on least one of an oxygen storage component, an alumina component and a zirconia component, wherein the platinum group metal component comprises platinum, rhodium, palladium, or any combination thereof, and wherein the amount of the platinum group metal component is 0.01 to 5.0 wt. % based on the total weight of the second layer; and c) a substrate, wherein the first layer and the second layer are separated by a barrier layer or a gap of 1 mm to 10 mm. The first layer or the second layer is deposited as a top layer or bottom layer on a substrate. In one of preferred embodiments of the present invention, the first layer is deposited as a bottom layer on a substrate and the second layer is deposited as a top layer on the bottom layer. The barrier layer comprises alumina, ceria, zirconia, ceria-zirconia composite, titania, and combinations thereof, wherein the barrier layer is substantially free from platinum group metals and non-PGM metals. The term "substantially free" means the amount of each of the platinum group metals and non-PGM metals present in the layer is less than 0.001% w/w. In accordance with the presently invention, the first layer is substantially free of platinum group metal(s) and the second layer is substantially free of nickel, copper and other base metal(s). The term "substantially free" means the amount of the platinum group metal present in the first layer is less than 0.001% w/w and the amount of nickel, copper and other base metal(s) present in the second layer is less than 0.001% w/w.

In one embodiment, the catalytic article comprises: a) a first layer comprising a nickel component and a copper component supported on a ceria component, deposited as a bottom layer on a substrate, wherein the amount of the nickel component is 0.1 to 30 wt. %, calculated as nickel oxide, based on the total weight of the first layer, and wherein the amount of the copper component is 0.01 to 5.0 wt. % calculated as copper oxide, based on the total weight of the first layer; b) a barrier layer comprising alumina, deposited as a middle layer on the first layer; and c) a second layer comprising a platinum group metal component supported on at least one of an oxygen storage component, an alumina component and a zirconia component, deposited as a top layer on the middle layer, wherein the platinum group metal component comprises platinum, rhodium, palladium, or any combination thereof, and wherein the amount of the platinum group metal component is 0.01 to 5.0 wt. % based on the total weight of the second layer.

In one embodiment, the catalytic article comprises: a) a first layer comprising a nickel component and a copper component supported on a ceria component, deposited as a bottom layer on a substrate, wherein the amount of the nickel component is 0.1 to 30 wt. %, calculated as nickel oxide, based on the total weight of the first layer, and wherein the amount of the copper component is 0.01 to 5.0 wt. % calculated as copper oxide, based on the total weight of the first layer; b) a barrier layer comprising alumina, deposited as a middle layer on the first layer, wherein the loading amount of alumina is in the range of 0.25 $g/in^3$ to 3.0 $g/in^3$; and c) a second layer comprising a platinum group metal component supported on at least one of an oxygen storage component, an alumina component and a zirconia component, deposited as a top layer on the middle layer, wherein the platinum group metal component comprises platinum, rhodium, palladium, or any combination thereof, and wherein the amount of the platinum group metal component is 0.01 to 5.0 wt. % based on the total weight of the second layer.

In one embodiment, the catalytic article comprises: a) a first layer comprising a nickel component and a copper component supported on a ceria component, deposited as a bottom layer on a substrate, wherein the amount of the nickel component is 0.1 to 30 wt. %, calculated as nickel oxide, based on the total weight of the first layer, and wherein the amount of the copper component is 0.01 to 5.0 wt. % calculated as copper oxide, based on the total weight of the first layer; b) a barrier layer comprising alumina, deposited as a middle layer on the first layer, wherein the loading amount of alumina is in the range of 0.5 $g/in^3$ to 2.0 $g/in^3$; and c) a second layer comprising a platinum group metal component supported on at least one of an oxygen storage component, an alumina component and a zirconia component, deposited as a top layer on the middle layer, wherein the platinum group metal component comprises platinum, rhodium, palladium, or any combination thereof, and wherein the amount of the platinum group metal component is 0.01 to 5.0 wt. % based on the total weight of the second layer.

In another embodiment, the catalytic article comprises: a) a first layer comprising a nickel component and a copper component supported on a ceria component, deposited as a bottom layer on a substrate, wherein the amount of the nickel component is 0.1 to 30 wt. %, calculated as nickel oxide, based on the total weight of the first layer, and wherein the amount of the copper component is 0.01 to 5.0 wt. % calculated as copper oxide, based on the total weight of the first layer; b) a barrier layer comprising alumina and a dopant for the carrier selected from barium, strontium, calcium, magnesium and lanthanum, deposited as a middle layer on the first layer, wherein the loading amount of alumina is in the range of 0.25 g/in$^3$ to 3.0 g/in$^3$; and c) a second layer comprising a platinum group metal component supported on at least one of an oxygen storage component, an alumina component and a zirconia component, deposited as a top layer on the middle layer, wherein the platinum group metal component comprises platinum, rhodium, palladium, or any combination thereof, and wherein the amount of the platinum group metal component is 0.01 to 5.0 wt. % based on the total weight of the second layer.

The amount of the nickel component used in the first layer is 1. to 30 wt. % or 5.0 to 15 wt. % or 8.0 to 10 wt. %, calculated as nickel oxide, based on the total weight of the first layer. Typically, the nickel component comprises a water soluble or water insoluble nickel compound selected from nickel nitrate, nickel acetate, nickel carbonate, nickel sulfate, nickel oxide or any combination thereof. The amount of the copper component used in the first layer is 0.01 to 5.0 or 0.1 to 1 or 0.25 to 1 wt. %, based on the total weight of the first layer. Typically, the copper component comprises a water soluble or water insoluble copper compound selected from copper metal, copper oxide, copper hydroxide, copper acetate, copper nitrate, copper sulfate, copper carbonate, copper acetylacetonate or any combination thereof.

In one embodiment, the catalytic article comprises: a) a first layer comprising a nickel component and a copper component supported on a ceria component, deposited as a bottom layer on a substrate, wherein the amount of the nickel component is 8 to 10 wt. %, calculated as nickel oxide, based on the total weight of the first layer, and wherein the amount of the copper component is 0.1 to 0.5 wt. % calculated as copper oxide, based on the total weight of the first layer; b) a barrier layer comprising alumina, deposited as a middle layer on the first layer; and c) a second layer comprising a platinum group metal component supported on at least one of an oxygen storage component, an alumina component and a zirconia component, deposited as a top layer on the middle layer, wherein the platinum group metal component comprises platinum, rhodium, palladium, or any combination thereof, and wherein the amount of the platinum group metal component is 0.01 to 5.0 wt. % based on the total weight of the second layer. In one exemplary embodiment a catalytic article comprising: a) a first layer comprising a nickel component and a copper component supported on a ceria component, wherein the amount of the nickel component is 0.1 to 30 wt. %, calculated as nickel oxide, based on the total weight of the first layer, and wherein the amount of the copper component is 0.01 to 5.0 wt. % calculated as copper oxide, based on the total weight of the first layer; b) a second layer comprising a platinum group metal component supported on each of an oxygen storage component and an alumina component, wherein the amount of the platinum group metal component supported on the oxygen storage component is in the range of 25 to 75 wt. % with respect to the total amount of the platinum group metal component present in the second layer whereas, the amount of the platinum group metal component supported on the alumina component is in the range of 25 to 75 wt. % with respect to the total amount of the platinum group metal component present in the second layer, wherein the platinum group metal component comprises platinum, rhodium, palladium, or any combination thereof, and wherein the amount of the platinum group metal component is 0.01 to 5.0 wt. % based on the total weight of the second layer; and c) a substrate, wherein the first layer and the second layer are separated by a barrier layer or a gap.

In another design of the catalytic article, the first layer and the second layer are deposited as two zones on a substrate separated with a pre-determined gap. The term "pre-determined gap" refers to a space or distance or break between the two layers or two zones (front zone (first zone) and rear zone (second zone)) so that the two layers or two zones are not in direct contact with each other. The pre-determined gap may be from 1 mm to 10 mm. In one exemplary embodiment, the catalytic article comprises: a) a first layer comprising a nickel component and a copper component supported on a ceria component, deposited on a substrate as a rear zone (second zone), wherein the amount of the nickel component is 0.1 to 30 wt. %, calculated as nickel oxide, based on the total weight of the first layer, and wherein the amount of the copper component is 0.01 to 5 wt. % calculated as copper oxide, based on the total weight of the first layer; and b) a second layer comprising a platinum group metal component supported on at least one of an oxygen storage component, an alumina component and a zirconia component, deposited on the substrate as a front zone (first zone), wherein the platinum group metal component comprises platinum, rhodium, palladium, or any combination thereof, and wherein the amount of the platinum group metal component is 0.01 to 5.0 wt. % based on the total weight of the second layer; wherein the first layer and the second layer are separated by a gap of 1 mm to 10 mm. In another exemplary embodiment, the catalytic article comprises: a) a first layer comprising a nickel component and a copper component supported on a ceria component, deposited on a substrate as a rear zone, wherein the amount of the nickel component is 8 to 10 wt. %, calculated as nickel oxide, based on the total weight of the first layer, and wherein the amount of the copper component is 0.1 to 0.5 wt. % calculated as copper oxide, based on the total weight of the first layer; and b) a second layer comprising a platinum group metal component supported on at least one of an oxygen storage component, an alumina component and a zirconia component, deposited on the substrate as a front zone, wherein the platinum group metal component comprises platinum, rhodium, palladium, or any combination thereof, and wherein the amount of the platinum group metal component is 0.01 to 5.0 wt. % based on the total weight of the second layer; wherein the first layer and the second layer are separated by a gap of 1 mm to 10 mm.

In one exemplary embodiment a catalytic article comprising: a) a first layer comprises a front zone or a rear zone, wherein the front or rear zone covers 30 to 90% of the length of the substrate and comprises a nickel component and a copper component supported on a ceria component, wherein the amount of the nickel component is 0.1 to 30 wt. %, calculated as nickel oxide, based on the total weight of the first layer, and wherein the amount of the copper component is 0.01 to 5.0 wt. % calculated as copper oxide, based on the total weight of the first layer; b) a second layer comprising a platinum group metal component supported on each of an oxygen storage component and an alumina component, wherein the amount of the platinum group metal component supported on the oxygen storage component is in the range of 25 to 75 wt. % with respect to the total amount of the platinum group metal component present in the second layer whereas, the amount of the platinum group metal component supported on the alumina component is in the range of 25 to 75 wt. % with respect to the total amount of the platinum group metal component present in the second layer, wherein the platinum group metal component comprises platinum, rhodium, palladium, or any combination thereof, and wherein the amount of the platinum group metal component is 0.01 to 5.0 wt. % based on the total weight of the second layer; and c) a substrate, wherein the first layer and the second layer are separated by a barrier layer or a gap.

In another exemplary embodiment a catalytic article comprising: a) a first layer comprises a nickel component and a copper component supported on a ceria component, wherein the amount of the nickel component is 0.1 to 30 wt. %, calculated as nickel oxide, based on the total weight of the first layer, and wherein the amount of the copper component is 0.01 to 5.0 wt. % calculated as copper oxide, based on the total weight of the first layer; b) a second layer a front zone or a rear zone, wherein the front or rear zone covers 30 to 90% of the length of the substrate and comprises a platinum group metal component supported on each of an oxygen storage component and an alumina component, wherein the amount of the platinum group metal component supported on the oxygen storage component is in the range of 25 to 75 wt. % with respect to the total amount of the platinum group metal component present in the second layer whereas, the amount of the platinum group metal component supported on the alumina component is in the range of 25 to 75 wt. % with respect to the total amount of the platinum group metal component present in the second layer, wherein the platinum group metal component comprises platinum, rhodium, palladium, or any combination thereof, and wherein the amount of the platinum group metal component is 0.01 to 5.0 wt. % based on the total weight of the second layer; and c) a substrate, wherein the first layer and the second layer are separated by a barrier layer or a gap.

The ceria component utilized for supporting the nickel component and copper component in the first layer comprises ceria having a specific surface area in the range of 15 $m^2/g$ to 60 $m^2/g$ after calcination at 950° C. for 12 hours in air, and the amount of the ceria component is 20 to 80 wt. %, based on the total weight of the first layer. The ceria component of the first layer may further comprises a dopant selected from zirconia, yttria, praseodymia, lanthana, neodymia, samaria, gadolinia, alumina, titania, baria, strontia, and combinations thereof, and the amount of the dopant is 1 to 20 wt. %, based on the total weight of the ceria component. An exemplary oxygen storage component which is utilized to support the platinum group metal component in the second layer includes ceria-zirconia, ceria-zirconia-lanthana, ceria-zirconia-yttria, ceria-zirconia-lanthana-yttria, ceria-zirconia-neodymia, ceria-zirconia-praseodymia, ceria-zirconia-lanthana-neodymia, ceria-zirconia-lanthana-praseodymia, ceria-zirconia-lanthana-neodymia-praseodymia, or any combination thereof. The amount of the oxygen storage component utilized is 20 to 80 wt. %, based on the total weight of the second layer. In one embodiment, the oxygen storage component comprises ceria-zirconia. The ceria content of the oxygen storage component in the second layer is in the range of 5 to 50 wt. %, based on the total weight of the oxygen storage component. The alumina component utilized for supporting the platinum group metal component in the second layer comprises alumina, lanthana-alumina, ceria-alumina, ceria-zirconia-alumina, zirconia-alumina, lanthana-zirconia-alumina, baria-alumina, baria-lanthana-alumina, baria-lanthana-neodymia-alumina, or any combination thereof. The amount of the alumina component is in the range of 10 to 80 wt. %, based on the total weight of the second layer.

As used herein, the term "substrate" refers to the monolithic material onto which the catalyst composition is placed, typically in the form of a washcoat containing a plurality of particles containing a catalytic composition thereon. Reference to "monolithic substrate" or "honeycomb substrate" means a unitary structure that is homogeneous and continuous from inlet to outlet. As used herein, the term "washcoat" has its usual meaning in the art of a thin, adherent coating of a catalytic or other material applied to a substrate material, such as a honeycomb-type carrier member, which is sufficiently porous to permit the passage of the gas stream being treated. A washcoat is formed by preparing a slurry containing a certain solid content (e.g., 15-60% by weight) of particles in a liquid vehicle, which is then coated onto a substrate and dried to provide a washcoat layer. As used herein and as described in Heck, Ronald and Farrauto, Robert, Catalytic Air Pollution Control, New York: Wiley-Interscience, 2002, pp. 18-19, a washcoat layer includes a compositionally distinct layer of material disposed on the surface of a monolithic substrate or an underlying washcoat layer. In one embodiment, a substrate contains one or more washcoat layers, and each washcoat layer is different in some way (e.g., may differ in physical properties thereof such as, for example particle size or crystallite phase) and/or may differ in the chemical catalytic functions. The catalyst article may be "fresh" meaning it is new and has not been exposed to any heat or thermal stress for a prolonged period of time. "Fresh" may also mean that the catalyst was recently prepared and has not been exposed to any exhaust gases or elevated temperatures. Likewise, an "aged" catalyst article is not fresh and has been exposed to exhaust gases and elevated temperatures (i.e., greater than 500° C.) for a prolonged period of time (i.e., greater than 3 hours). According to one or more embodiments, the substrate of the catalytic article of the presently claimed invention may be constructed of any material typically used for preparing automotive catalysts and typically comprises a ceramic or a metal monolithic honeycomb structure. In one embodiment, the substrate is ceramic substrate, metal substrate, ceramic foam substrate, polymer foam substrate or woven fiber substrate. The substrate typically provides a plurality of wall surfaces upon which washcoats comprising the catalyst compositions described herein above are applied and adhered, thereby acting as a carrier for the catalyst compositions. Exemplary metallic substrates include heat resistant metals and metal alloys such as titanium and stainless steel as well as other alloys in which iron is a substantial or major component. Such alloys may contain one or more nickel, chromium, and/or aluminium, and the total amount of these metals may advantageously comprise at least 15 wt. % of the alloy. e.g. 10-25 wt. % of chromium, 3-8% of aluminium, and up to 20 wt. % of nickel. The alloys may also contain small or trace amounts of one or more metals such as manganese, copper, vanadium, titanium and the like. The surface of the metal substrate may be oxidized at high temperature, e.g., 1000° C. and higher, to form an oxide layer on the surface of the substrate, improving the corrosion resistance of the alloy and facilitating adhesion of the washcoat layer to the metal surface. Ceramic materials used to construct the substrate may include any suitable refractory material, e.g., cordierite, mullite, cordierite-alumina, silicon nitride, zircon mullite, spodumene, alumina-silica magnesia, zircon silicate, sillimanite, magnesium silicates, zircon, petalite, alumina, aluminosilicates and the like. Any suitable substrate may be employed, such as a monolithic flow-through substrate having a plurality of fine, parallel gas flow passages extending from an inlet to an outlet face of the substrate such that passages are open to fluid flow. The passages, which are essentially straight paths from the inlet to the outlet, are defined by walls on which the catalytic material is coated as a washcoat so that the gases flowing through the passages contact the catalytic material. The flow passages of the monolithic substrate are thin-walled channels which are of any suitable cross-sectional shape, such as trapezoidal, rectangular, square, sinusoidal, hexagonal, oval, circular, and the like. Such structures contain from 60 to 1200 or more gas inlet openings (i.e., "cells") per square inch of cross section (cpsi), more usually from 300 to 900 cpsi. The wall thickness of flow-through substrates can vary, with a typical range being between 0.002 and 0.1 inches. A representative commercially-available flow-through substrate is a cordierite substrate having 400 cpsi and a wall thickness of 6 mil, or 600 cpsi and a wall thickness of 4 mil. However, it will be understood that the invention is not limited to a particular substrate type, material, or geometry. In alternative embodiments, the substrate may be a wall-flow substrate, wherein each passage is blocked at one end of the substrate body with a non-porous plug, with alternate passages blocked at opposite end-faces. This requires that gas flow through the porous walls of the wall-flow substrate to reach the exit. Such monolithic substrates may contain up to 700 or more cpsi, such as 100 to 400 cpsi and more typically 200 to 300 cpsi. The cross-sectional shape of the cells can vary as described above. Wall-flow substrates typically have a wall thickness between 0.002 and 0.1 inches. A representative commercially available wall-flow substrate is constructed from a porous cordierite, an example of which has 200 cpsi and 10 mil wall thickness or 300 cpsi with 8 mil wall thickness, and wall porosity between 45-65%. Other ceramic materials such as aluminum-titanate, silicon carbide and silicon nitride are also used as wall-flow filter substrates. However, it will be understood that the invention is not limited to a particular substrate type, material, or geometry. Note that where the substrate is a wall-flow substrate, the catalyst composition can permeate into the pore structure of the porous walls (i.e., partially or fully occluding the pore openings) in addition to being disposed on the surface of the walls. In one embodiment, the substrate has a flow through ceramic honeycomb structure, a wall-flow ceramic honeycomb structure, or a metal honeycomb structure.

As used herein, the term "stream" broadly refers to any combination of flowing gas that may contain solid or liquid particulate matter.

As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine.

Figure 6A:
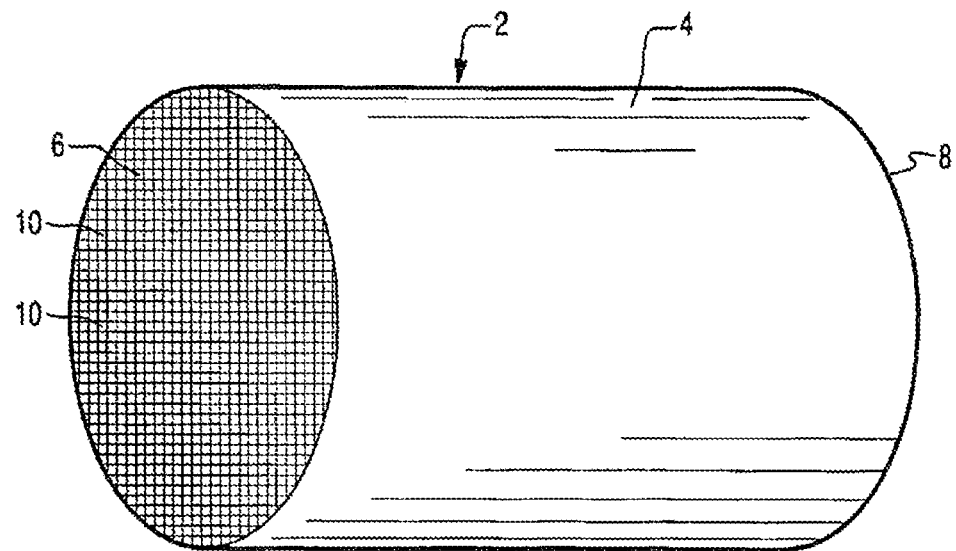
FIG. 6A is a perspective view of a honeycomb-type substrate carrier which may comprise the catalyst composition in accordance with one embodiment of the presently claimed invention.
Figure 6B:
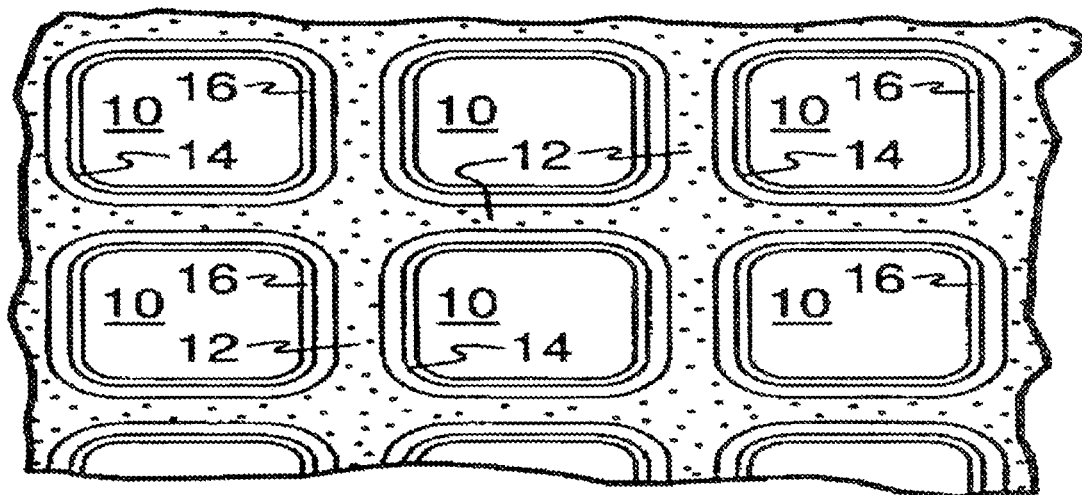
FIG. 6B is a partial cross-section view enlarged relative to FIG. 6A and taken along a plane parallel to the end faces of the substrate carrier of FIG. 6A, which shows an enlarged view of a plurality of the gas flow passages shown in FIG. 6A.

FIGS. 6A and 6B illustrate an exemplary substrate 2 in the form of a flow-through substrate coated with washcoat compositions as described herein. Referring to FIG. 6A, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 6B, flow passages 10 are formed by walls 12 and extend through substrate 2 from upstream end face 6 to downstream end face 8, the passages 10 being unobstructed so as to permit the flow of a fluid, e.g., a gas stream, longitudinally through substrate 2 via gas flow passages 10 thereof. As more easily seen in FIG. 6, walls 12 are so dimensioned and configured that gas flow passages 10 have a substantially regular polygonal shape. As shown, the washcoat compositions can be applied in multiple, distinct layers if desired. In the illustrated embodiment, the washcoats consist of a discrete first washcoat layer 14 adhered to the walls 12 of the substrate member and a second discrete washcoat layer 16 coated over the first washcoat layer 14. In one embodiment, the presently claimed invention is also practiced with two or more (e.g., 3, or 4) washcoat layers and is not limited to the illustrated two-layer embodiment.

Figure 7:
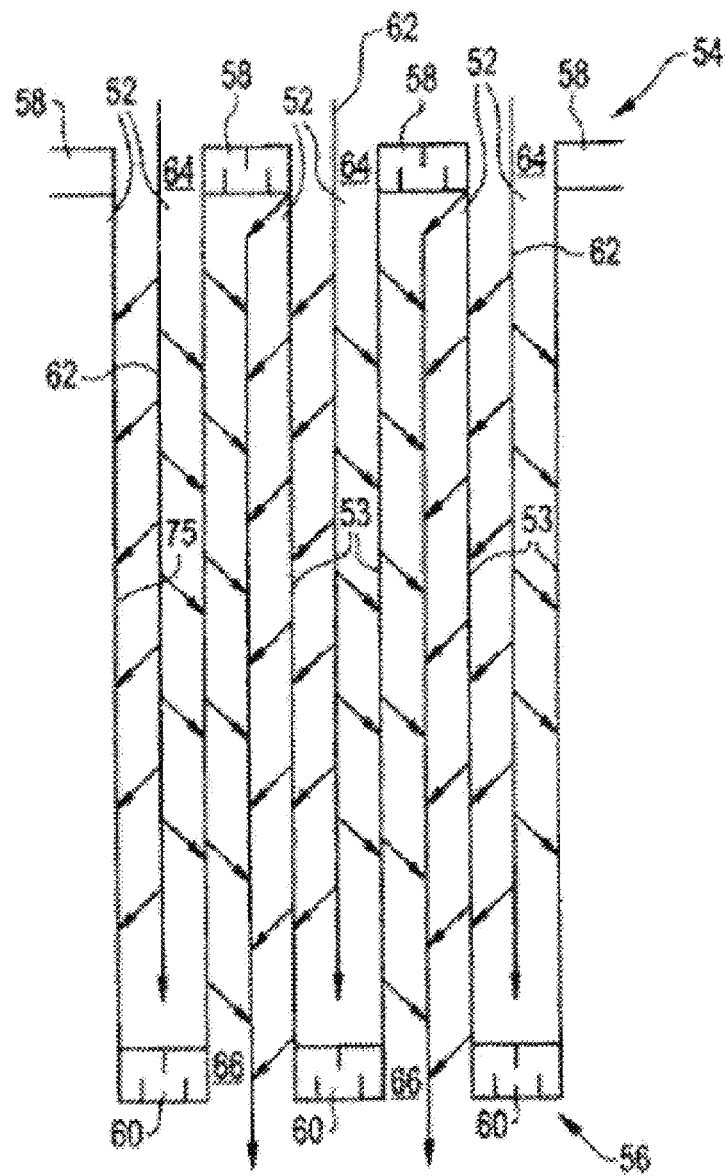
FIG. 7 is a cutaway view of a section enlarged relative to FIG. 6A, wherein the honeycomb-type substrate in FIG. 6A represents a wall flow filter substrate monolith.

FIG. 7 illustrates an exemplary substrate 2 in the form of a wall flow filter substrate coated with a washcoat composition as described herein. As seen in FIG. 7, the exemplary substrate 2 has a plurality of passages 52. The passages are tubularly enclosed by the internal walls 53 of the filter substrate. The substrate has an inlet end 54 and an outlet end 56. Alternate passages are plugged at the inlet end with inlet plugs 58 and at the outlet end with outlet plugs 60 to form opposing checkerboard patterns at the inlet 54 and outlet 56. A gas stream 62 enters through the unplugged channel inlet 64, is stopped by outlet plug 60 and diffuses through channel walls 53 (which are porous) to the outlet side 66. The gas cannot pass back to the inlet side of walls because of inlet plugs 58. The porous wall flow filter used in this invention is catalysed in that the wall of said element has thereon or contained therein one or more catalytic materials. Catalytic materials may be present on the inlet side of the element wall alone, the outlet side alone, both the inlet and outlet sides, or the wall itself may consist all, or in part, of the catalytic material. This invention includes the use of one or more layers of catalytic material on the inlet and/or outlet walls of the element.

In accordance with still another aspect, the presently claimed invention provides a process for the preparation of the catalytic article(s) described herein above, wherein the first layer and the second layer are separated by the barrier layer. The process comprises preparing a first layer slurry; depositing the first layer slurry on a substrate to obtain a first layer; preparing a barrier layer slurry and depositing the barrier layer slurry as a middle layer on the first layer; preparing a second layer slurry; and depositing the second layer slurry on the middle layer to obtain a second layer followed by calcination at a temperature ranging from 400 to 700° C., wherein the step of preparing the first layer slurry or second layer slurry comprises a technique selected from incipient wetness impregnation, incipient wetness co-impregnation, and post-addition. The process for preparing the catalytic article(s) described herein above, wherein the first layer and the second layer are separated by a gap comprises preparing a first layer slurry; depositing the first layer slurry on a substrate as a front zone (first zone) to obtain a first layer; preparing a second layer slurry; and depositing the second layer slurry on the substrate as a rear zone (second zone) to obtain a second layer, followed by calcination at a temperature ranging from 400 to 700° C., wherein the first layer and the second layer are separated by a gap of 1 mm to 10 mm on the substrate, wherein the step of preparing the first layer slurry or second layer slurry comprises a technique selected from incipient wetness impregnation, incipient wetness co-impregnation, and post-addition.

Incipient wetness impregnation techniques, also called capillary impregnation or dry impregnation are commonly used for the synthesis of heterogeneous materials, i.e., catalysts. Typically, an active metal precursor is dissolved in an aqueous or organic solution and then the metal-containing solution is added to a catalyst support containing the same pore volume as the volume of the solution that was added. Capillary action draws the solution into the pores of the support. Solution added in excess of the support pore volume causes the solution transport to change from a capillary action process to a diffusion process, which is much slower. The catalyst is dried and calcined to remove the volatile components within the solution, depositing the metal on the surface of the catalyst support. The concentration profile of the impregnated material depends on the mass transfer conditions within the pores during impregnation and drying. Multiple active metal precursors, after appropriate dilution, can be co-impregnated onto a catalyst support. Alternatively, an active metal precursor is introduced to a slurry via post-addition under agitation during the process of a slurry preparation.

The support particles are typically dry enough to absorb substantially all of the solution to form a moist solid. Aqueous solutions of water-soluble compounds or complexes of the active metal are typically utilized, such as rhodium chloride, rhodium nitrate, rhodium acetate, or combinations thereof where rhodium is the active metal and palladium nitrate, palladium tetra amine, palladium acetate, or combinations thereof where palladium is the active metal. Following treatment of the support particles with the active metal solution, the particles are dried, such as by heat treating the particles at elevated temperature (e.g., 100-150° C.) fora period of time (e.g., 1-3 hours), and then calcined to convert the active metal to a more catalytically active form. An exemplary calcination process involves heat treatment in air at a temperature of 400-550° C. for 10 min to 3 hours. The above process can be repeated as needed to reach the desired level of loading of the active metal by means of impregnation.

The above-noted catalyst compositions are typically prepared in the form of catalyst particles as noted above. These catalyst particles are mixed with water to form a slurry for purposes of coating a catalyst substrate, such as a honeycomb-type substrate. In addition to the catalyst particles, the slurry may optionally contain a binder in the form of alumina, silica, zirconium acetate, colloidal zirconia, or zirconium hydroxide, associative thickeners, and/or surfactants (including anionic, cationic, non-ionic or amphoteric surfactants). Other exemplary binders include boehmite, gamma-alumina, or delta/theta alumina, as well as silica sol. When present, the binder is typically used in an amount of 1-5 wt. % of the total washcoat loading. Addition of acidic or basic species to the slurry is carried out to adjust the pH accordingly. For example, in some embodiments, the pH of the slurry is adjusted by the addition of ammonium hydroxide, aqueous nitric acid, or acetic acid. A typical pH range for the slurry is 3 to 12.

The slurry can be milled to reduce the particle size and enhance particle mixing. The milling is accomplished in a ball mill, continuous mill, or other similar equipment, and the solids content of the slurry may be, e.g., 20-60 wt. %, more particularly 20-40 wt. %. In one embodiment, the post-milling slurry is characterized by a $D_{90}$ particle size of 3 to 40 microns, preferably 10 to 30 microns, more preferably 10 to 15 microns. The $D_{90}$ is determined using a dedicated particle size analyzer. The equipment employed in this example uses laser diffraction to measure particle sizes in small volume slurry. The $D_{90}$, typically with units of microns, means 90% of the particles by number have a diameter less than that value.

The slurry is coated on the catalyst substrate using any washcoat technique known in the art. In one embodiment, the catalyst substrate is dipped one or more times in the slurry or otherwise coated with the slurry. Thereafter, the coated substrate is dried at an elevated temperature (e.g., 100-150° C.) for a period (e.g., 10 min-3 hours) and then calcined by heating, e.g., at 400-700° C., typically for 10 minutes to 3 hours. Following drying and calcining, the final washcoat coating layer is viewed as essentially solvent-free. After calcining, the catalyst loading obtained by the above described washcoat technique can be determined through calculation of the difference in coated and uncoated weights of the substrate. As will be apparent to those of skill in the art, the catalyst loading can be modified by altering the slurry rheology. In addition, the coating/drying/calcining process to generate a washcoat can be repeated as needed to build the coating to the desired loading level or thickness, meaning more than one washcoat may be applied.

In certain embodiments, the coated substrate is aged, by subjecting the coated substrate to heat treatment. In one embodiment, aging is done at a temperature of 850° C. to 1050° C. in an environment of 10 vol. % water in air for 25 hours. Aged catalyst articles are thus provided in certain embodiments. In certain embodiments, particularly effective materials comprise metal oxide-based supports (including, but not limited to substantially 100% ceria supports) that maintain a high percentage (e.g., 95-100%) of their pore volumes upon aging (e.g., at 850° C. to 1050° C., 10 vol. % water in air, 25 hours aging).

In another aspect, the presently claimed invention provides an exhaust system for internal combustion engines. The exhaust system comprises a catalytic article as described herein above. In one embodiment, the exhaust system comprises a catalytic article comprising a) a first layer comprising a nickel component and a copper component supported on a ceria component, wherein the amount of the nickel component is 0.1 to 30 wt. %, calculated as nickel oxide, based on the total weight of the first layer, and wherein the amount of the copper component is 0.01 to 5.0 wt. % calculated as copper oxide, based on the total weight of the first layer; b) a second layer comprising a platinum group metal component supported on least one of an oxygen storage component, an alumina component and a zirconia component, wherein the platinum group metal component comprises platinum, rhodium, palladium, or any combination thereof, and wherein the amount of the platinum group metal component is 0.01 to 5.0 wt. % based on the total weight of the second layer; and c) a substrate, wherein the first layer and the second layer are separated by a barrier layer or a gap of 1 mm to 10 mm. The exhaust system optionally comprises a platinum group metal based three-way conversion (TWC) catalytic article comprising 1 to 300 g/ft$^3$ of a platinum group metal selected from platinum, palladium, rhodium and combinations thereof. FIGS. 2B and 2C illustrate the representative exhaust systems in which the conventional PGM-TWC catalytic article (TWC) and the catalytic article of the presently claimed invention (PGM+ Non-PGM, invention catalyst (I-UF1 or I-UF1-zoned) are arranged at different positions with respect to the engine. In one illustrative example, the exhaust system comprises a platinum group metal based three-way conversion (TWC) catalytic article and the catalytic article described herein above, wherein the platinum group metal based three-way conversion (TWC) catalytic article is positioned upstream or downstream from an internal combustion engine and the catalytic article of the present invention is positioned downstream/underfloor in fluid communication with the three-way conversion (TWC) catalytic article. The illustrative exhaust gas systems are shown in FIGS. 2A, 2B and 2C, wherein the FIG. 2A illustrates reference system, and FIGS. 2B and 2C illustrates present invention systems. In another illustrative example, the system comprises platinum group metal based three-way conversion (TWC) catalytic article and the catalytic article described herein above, wherein the catalytic article is positioned downstream from an internal combustion engine and the platinum group metal based three-way conversion (TWC) catalytic article is positioned downstream in fluid communication with the three-way conversion (TWC) catalytic article. The platinum group metal based TWC catalytic article is a conventional catalyst. The exemplary TWC catalytic article comprises rhodium, OSC, alumina and barium oxide deposited on a cordierite substrate. The TWC catalytic article is able to simultaneously treat $NO_x$, hydrocarbons and CO from exhaust.

Another exhaust system for internal combustion engines according to the presently claimed invention comprises an exhaust conduit in fluid communication with the internal combustion engine via an exhaust manifold; a TWC catalytic article (CC1) located upstream of the internal combustion engine in the exhaust conduit; and a catalytic article (CC2) of the presently claimed invention is positioned downstream of the close coupled catalyst in the exhaust conduit.

In another aspect, the presently claimed invention also provides a method of treating a gaseous exhaust stream which comprises hydrocarbons, carbon monoxide, and nitrogen oxide. The method involves contacting the exhaust stream with a catalytic article or an exhaust system according to the presently claimed invention. The terms "exhaust stream", "engine exhaust stream", "exhaust gas stream", and the like refer to any combination of flowing engine effluent gas that may also contain solid or liquid particulate matter. The stream comprises gaseous components and is, for example, exhaust of a lean burn engine, which may contain certain non-gaseous components such as liquid droplets, solid particulates and the like. An exhaust stream of a lean burn engine typically comprises combustion products, products of incomplete combustion, oxides of nitrogen, combustible and/or carbonaceous particulate matter (soot) and un-reacted oxygen and/or nitrogen. Such terms refer as well as to the effluent downstream of one or more other catalyst system components as described herein. In one embodiment, there is provided a method of treating exhaust stream containing carbon monoxide.

In still another aspect, the presently claimed invention also provides a method of reducing hydrocarbons, carbon monoxide, and nitrogen oxide levels in a gaseous exhaust stream. The method involves contacting the gaseous exhaust stream with a catalytic article or an exhaust system according to the presently claimed invention to reduce the levels of hydrocarbons, carbon monoxide, and nitrogen oxide in the exhaust gas. In one embodiment, there is provided a method of reducing carbon monoxide present in the gaseous exhaust stream significantly.

In yet another aspect, the presently claimed invention also provides use of the catalytic article of the presently claimed invention for purifying a gaseous exhaust stream comprising hydrocarbons, carbon monoxide, and nitrogen oxide. In some embodiments, the catalytic article converts at least 60%, or at least 70%, or at least 75%, or at least 80%, or at least 90%, or at least 95% of the amount of carbon monoxide present in the exhaust gas stream prior to contact with the catalytic article. In some embodiment, the catalytic article converts hydrocarbons to carbon dioxide and water. In some embodiments, the catalytic article converts at least 60%, or at least 70%, or at least 75%, or at least 80%, or at least 90%, or at least 95% of hydrocarbons present in the exhaust gas stream prior to contact with the catalytic article.

In some embodiment, the catalytic article converts carbon monoxide to carbon dioxide. In some embodiment, the catalytic article converts nitrogen oxides to nitrogen.

In some embodiments, the catalytic article converts at least 60%, or at least 70%, or at least 75%, or at least 80%, or at least 90%, or at least 95% of the amount of nitrogen oxides present in the exhaust gas stream prior to contact with the catalytic article. In some embodiment, the catalytic article converts at least 50%, or at least 60%, or at least 70%, or at least 80%, or at least 90%, or at least 95% of the total amount of hydrocarbons, carbon dioxide, and nitrogen oxides combined present in the exhaust gas stream prior to contact with the catalytic article.

EXAMPLES

Aspects of the presently claimed invention are more fully illustrated by the following examples, which are set forth to illustrate certain aspects of the present invention and are not to be construed as limiting thereof.

Example 1: Conventional CC TWC Catalyst (Catalyst 1) Preparation

A dual-layer TWC with a palladium bottom coat and a rhodium top coat was prepared. The PGM loading was 0/46/4 g/ft$^3$ for Pt/Pd/Rh, respectively. The bottom coat had a washcoat loading of 2.6 g/inch$^3$ and the top coat had a washcoat loading of 1 g/inch$^3$. A bottom coat slurry was prepared using OSC and alumina at a ratio of 2:3. 19 gm palladium nitrate solution containing 27.27% Pd by weight was impregnated onto a total of 875 gm of support material but was not calcined. Palladium was split between OSC and alumina in 50-50 proportion with each portion impregnated separately on the respective support. 63 gm of barium-acetate and 193 gm of zirconium-acetate were added to the bottom coat slurry. The slurry was milled once all components were added. A top coat slurry was prepared using 860 gm of alumina and 23.54 gm of rhodium-nitrate solution that contains 9.8% Rh by weight. Rhodium was supported on alumina without OSC. Rhodium was impregnated, but not calcined. The slurry was milled once all components are added. The bottom coat was coated as a first layer on a cordierite substrate and the top coat was coated on the bottom layer as a second layer.

Example 2: Conventional CC2 Catalyst (Underfloor Catalyst, Catalyst 2-Without Ni/Cu)

Rhodium-based single layer underfloor catalyst was prepared. The PGM loading was 0/0/3 g/ft$^3$ for Pt/Pd/Rh, respectively. The washcoat loading was 2.8 g/inch$^3$. A slurry was prepared using OSC and alumina at 1:2 ratio. 25.7 gm of barium acetate, 30 gm of strontium acetate and 8 gm of zirconyl acetate were mixed with water and 1000 gm support. 6.3 gm of rhodium nitrate solution with 9.8% rhodium by weight and 25 gm of barium acetate were added to the slurry to form a washcoat. There was no impregnation or pre-calcination of the PGM. The slurry was milled after all components were added. The milled slurry was coated as a layer on a cordierite substrate.

Example 3: Layered Rh/Ni/Cu Underfloor Catalyst Preparation (Catalyst-3-Without Barrier)

A dual-layer underfloor catalyst with a Cu/Ni-based bottom coat and a rhodium-based top coat was prepared. The PGM loading was 0/0/3 g/ft$^3$ for Pt/Pd/Rh, respectively. The bottom coat washcoat had a loading of 1.5 g/inch$^3$ and the top coat had a washcoat loading of 1.25 g/inch$^3$. A bottom coat slurry containing 70% ceria, 10% NiO and 0.5% CuO, 17% La$_2$O$_3$/ZrO$_2$ with the rest being a binder was prepared. Copper and nickel as nitrates were added directly to the slurry, or impregnated onto ceria, with or without subsequent calcination prior to slurry preparation. The top coat slurry was prepared using OSC and alumina at a 1:2 ratio. 25 gm of barium acetate and 6.3 gm of rhodium nitrate with 9.8% Rh-content were added to the slurry. There was no impregnation or pre-calcination of the PGM. The bottom coat was coated as a first layer on a cordierite substrate and the top coat was coated on the bottom layer as a second layer.

Example 4: Layered Rh/Ni/Cu Underfloor Catalyst Preparation (Catalyst 4-Invention Catalyst-With Barrier)

A tri-layer underfloor catalyst with a Cu/Ni-based bottom coat, an alumina-based middle coat and a rhodium-based top coat was prepared. The PGM loading was 0/0/3 g/ft$^3$ for Pt/Pd/Rh, respectively. The bottom coat had a washcoat loading of 1.5 g/inch$^3$, the middle coat had a washcoat loading of 1.25 g/inch$^3$ and the top coat had a washcoat loading of 1.25 g/inch$^3$. A bottom coat slurry containing 70% ceria, 10% NiO, 0.5% CuO and 17% La$_2$O$_3$/ZrO$_2$ with the rest being a binder was prepared. Copper and nickel as nitrates were added directly to the slurry, or impregnated onto ceria, with or without subsequent calcination prior to slurry preparation. The middle coat was prepared using a stabilized alumina without PGM or further base metal oxide (BMO). The top coat slurry was prepared containing OSC and alumina at a 1:2 ratio. 25 gm of barium acetate and 6.3 gm of rhodium nitrate with 9.8% Rh-content were added to the slurry. There was no impregnation or pre-calcination of the PGM. The bottom coat slurry was coated as a first layer on a cordierite substrate, followed by coating the middle coat on the bottom coat and coating the top coat slurry on the middle coat as a second layer.

Example 5: Zoned PGM/Non-PGM Catalyst Preparation (Catalyst 5-Invention Catalyst)

A zoned catalyst was prepared using a physical barrier (gap) to separate the PGM and non-PGM portions of the washcoat. The zoned catalyst was split ~50/~50 axially (with a gap of 1 mm to 10 mm) such that the front zone contained the catalyst described in example 2 and the rear zone comprises the Rh-free version of the catalyst described in example 3. The Rh-free catalyst slurry was prepared by the following process.

The washcoat had a loading of 1.5 g/inch$^3$. A coating slurry containing 70% ceria, 10% NiO and 0.5% CuO, 17% La$_2$O$_3$/ZrO$_2$ with the rest being a binder was prepared. Copper and nickel as nitrates were added directly to the slurry, or impregnated onto ceria, with or without subsequent calcination prior to slurry preparation. The zoned catalyst was prepared by coating the first slurry of example 2 on a front side of the substrate that serves as inlet and coating a second slurry containing copper, nickel, and ceria-lanthana-zirconia on a rear zone of the substrate that serves as outlet.

Aging and Testing:

All catalysts were washcoated onto 4.16×1.5" 600/3.5 cordierite substrates and calcined for 2 hrs. at 550° C. with a 2 hrs. ramp. The respective calcined catalysts were then cored to obtain 1×1.5" cores, which were aged using a pulse-flame reactor setup to mimic ZDAKW aging. The aging was performed for 25 hrs. at 950° C. The aged cores were then tested on a reactor capable of operating under conditions required for EPA US06 testing. All catalysts and/or systems were tested using the same oxygen/fuel ratio (lambda) and temperature profile as well as inlet gas composition. The exhaust gas was analysed to determine the catalyst conversion efficiency for CO, THC, NO and NH$_3$.

Example 6

Example 6 contained a conventional TWC (Catalyst 1, CC1) and a conventional catalyst (Catalyst 2, UF1).

Example 7

Example 7 contained a conventional TWC (Catalyst 1, CC1) and a layered Rh/Ni/Cu catalyst (Catalyst 3, UF1).

Example 8

Example 8 contained a conventional TWC (Catalyst 1, CC1) and a layered Rh/Ni/Cu catalyst with an alumina barrier (Catalyst 4, Invention Catalyst).

Example 9

Example 9 contained a conventional TWC (Catalyst 1, CC1) and a zoned Rh/Ni/Cu catalyst (Catalyst 5, Invention Catalyst). These examples may be referred as catalyst systems.

Figure 3A:
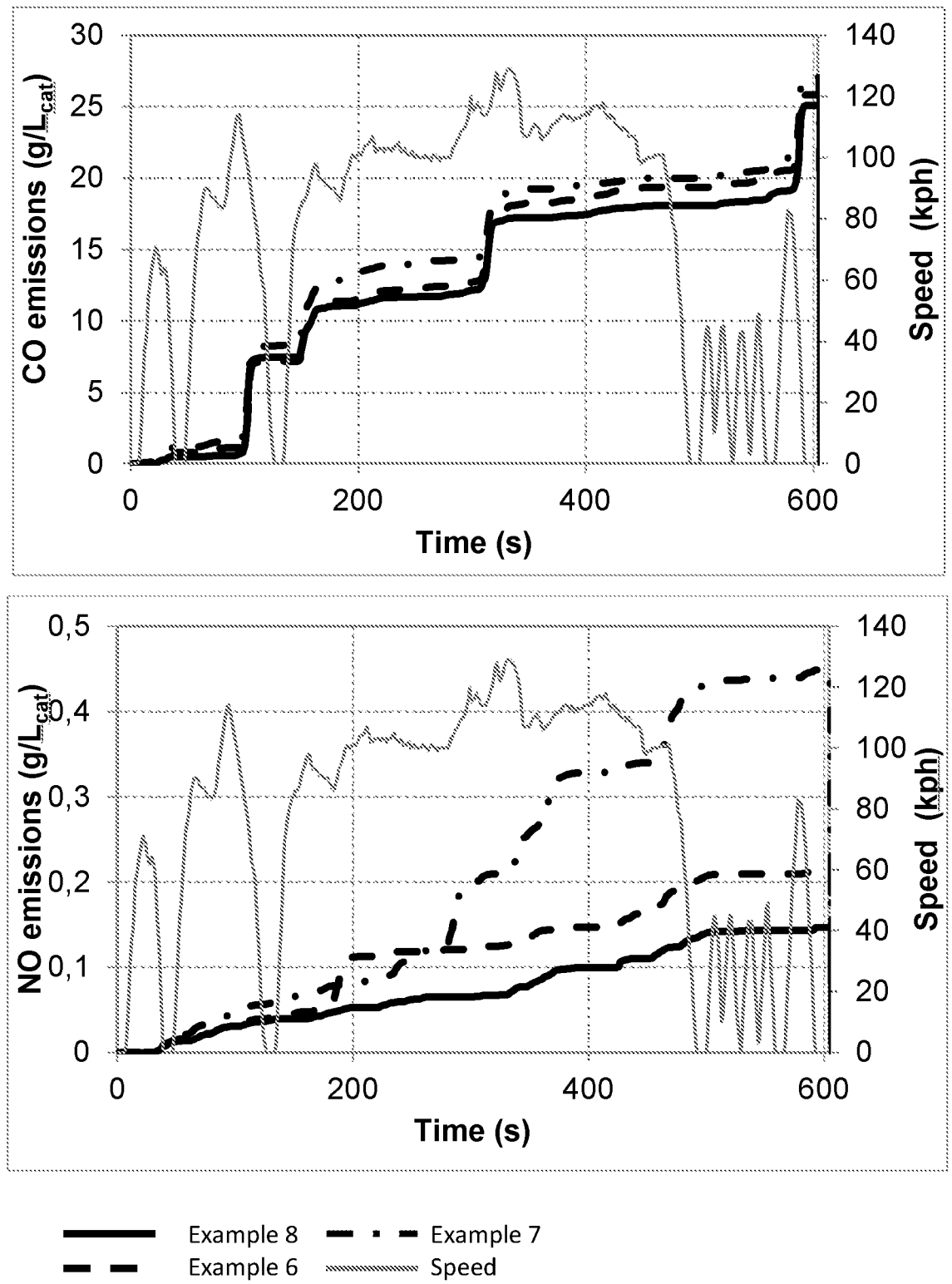
FIGS. 3A and 3B are line graphs showing comparative test results for cumulative CO emission, HC emission, NO emission and $NH_3$ of various catalyst materials.
Figure 3B:
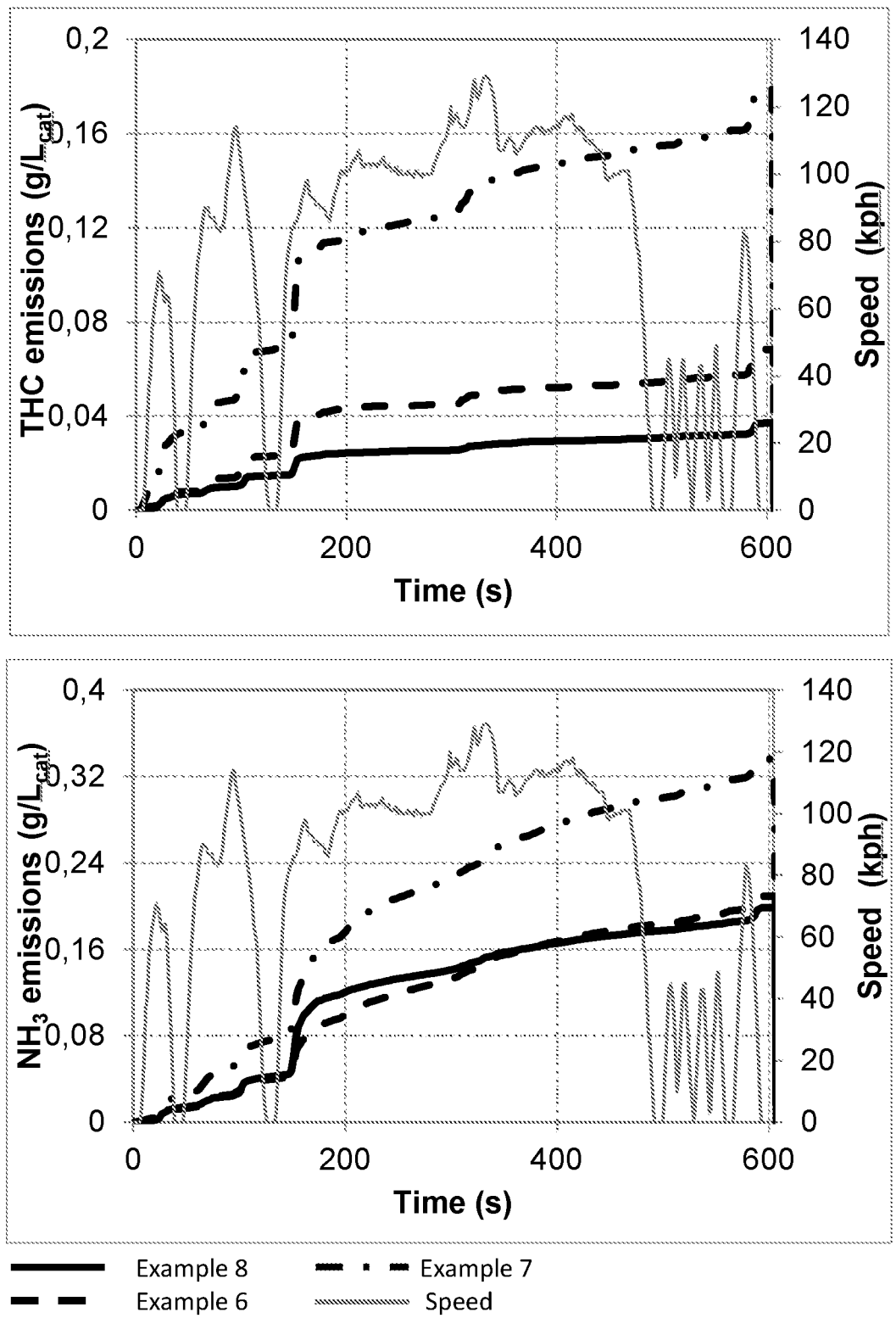
Figure 4A:
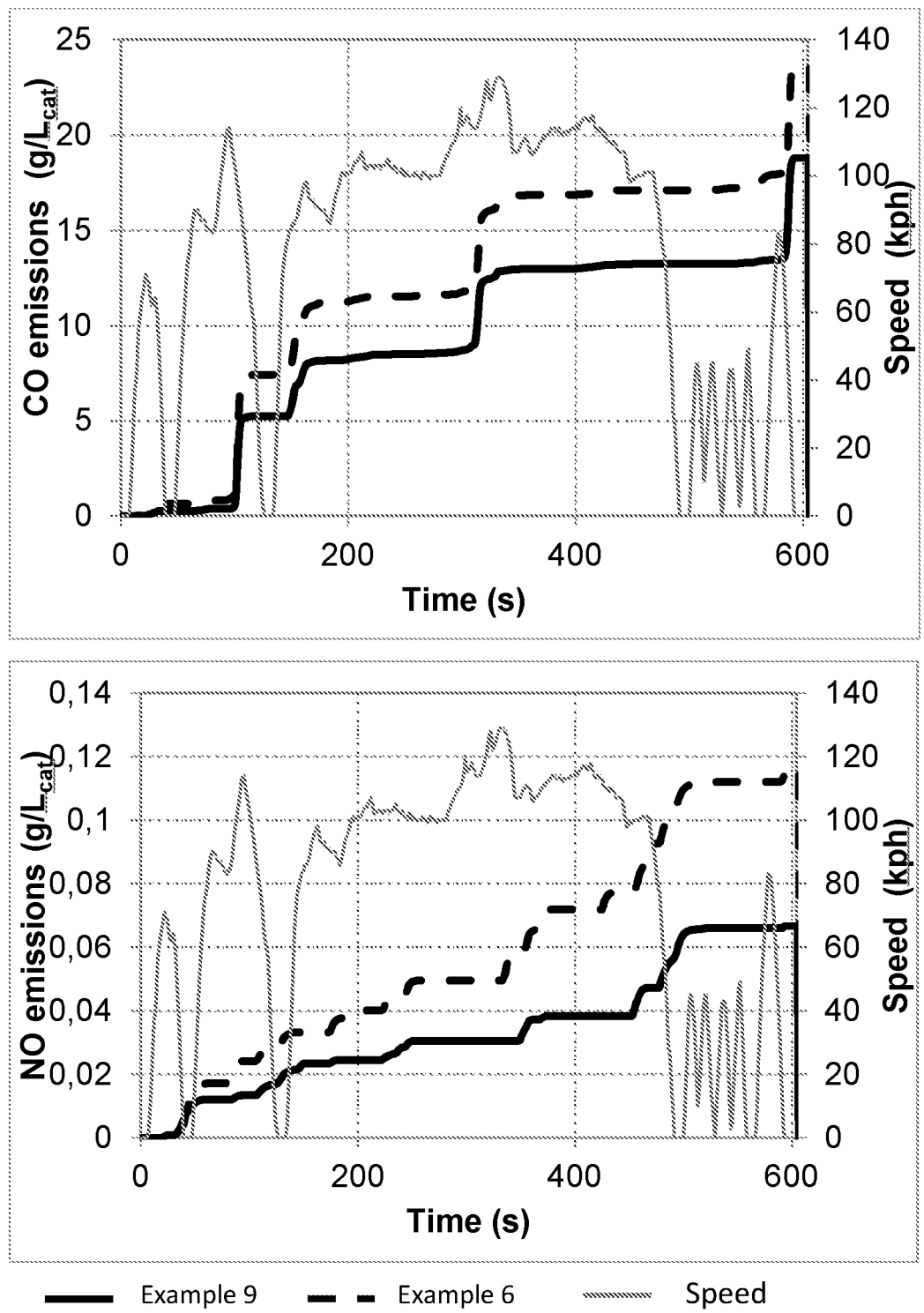
FIGS. 4A and 4B are line graphs showing comparative test results for cumulative CO emission, HC emission, NO emission and $NH_3$ of various catalyst materials.
Figure 4B:
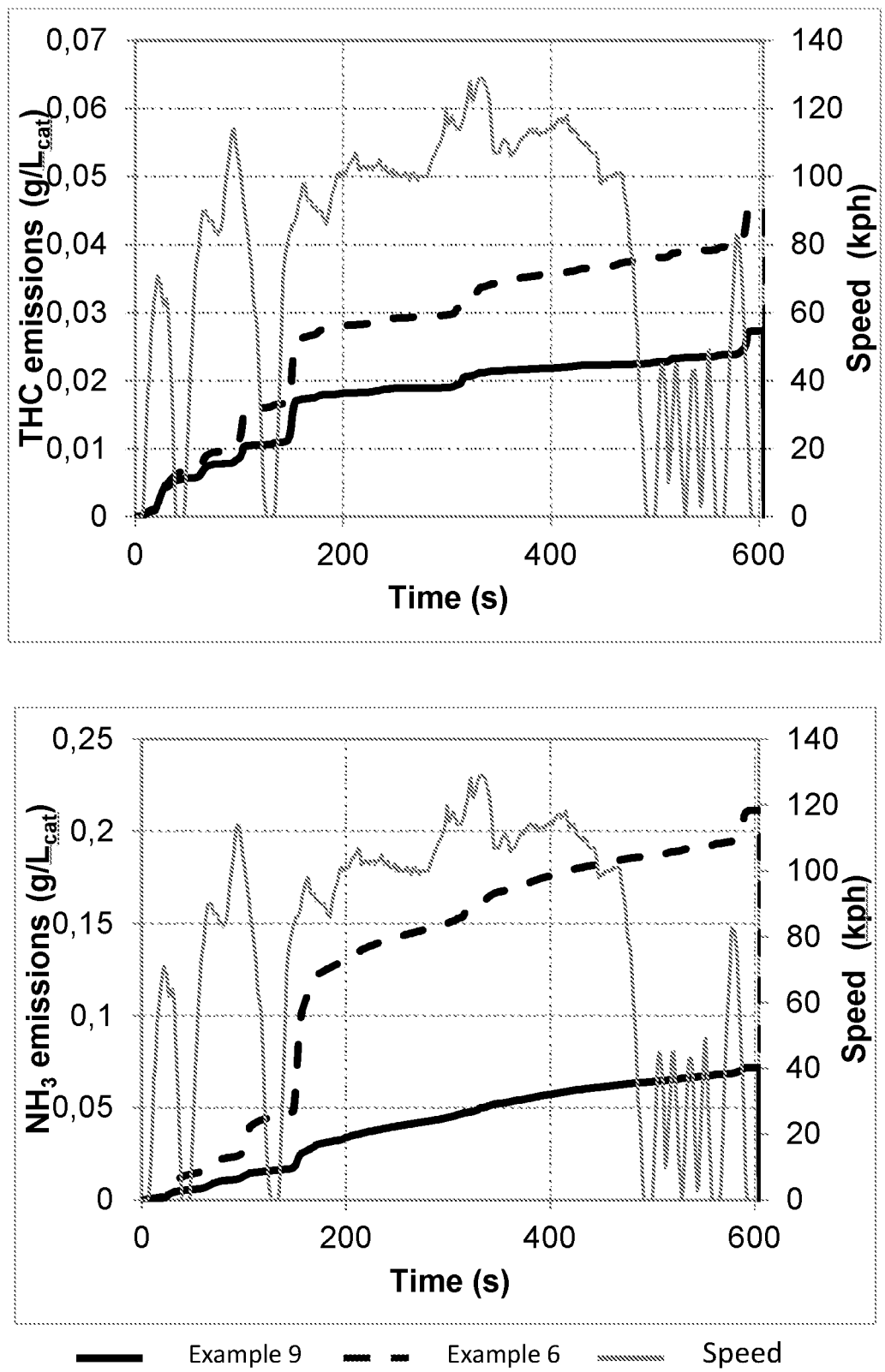

Comparative emission reductions are illustrated in accompanying FIGS. 3A, 3B, 4A, and 4B). FIG. 3A illustrates comparative CO and NO emission results for the catalysts of examples 6, 7 and 8. FIG. 3B illustrates comparative THC and NH$_3$ emission results for the catalysts of examples 6, 7 and 8. FIG. 4A illustrates comparative CO and NO emission results for the catalysts of examples 6 and 9. FIG. 4B illustrates comparative THC and NH$_3$ emission results for the catalysts of examples 6 and 9. Example 8 displayed improved reduction in CO, NO, THC and NH$_3$ by 3, 31, 47 and 5% respectively compared to the example 6. Example 7 showed adverse effect on CO, NO, THC and NH$_3$ reduction though the presence of Cu and Ni. That is, the CO, NO, THC and NH$_3$ emissions were increased by 5, 109, 155 and 60%, respectively, compared to the example 6. The example 9 demonstrated improved reduction in CO, NO, THC and NH$_3$ by 20, 40, 42 and 66%, respectively, compared to the example 6. The comparison of emission results clearly illustrates the significance of a barrier layer or separation between the PGM and non-PGM to achieve the significant reduction in pollutants.

Example 10

Various catalysts (A-E) were prepared using the following respective compositions as per the process illustrated in Example 5 to optimise the proportion of nickel and copper in order to achieve the optimum reduction in pollutants.

Catalyst A was prepared using 0.5% Cu and 3.5% Ni.
Catalyst B was prepared using 0.5% Cu and 8% Ni.
Catalyst C was prepared using 0.5% Cu and 10% Ni.
Catalyst D was prepared using 5% Cu and 10% Ni.
Catalyst E was prepared using 0% Cu+10% Ni

Example 11

Example 11 contained a conventional TWC (Catalyst 1, CC1) and a zoned Rh/Ni/Cu catalyst (Catalyst A).

Example 12

Example 12 contained a conventional TWC (Catalyst 1, CC1) and a zoned Rh/Ni/Cu catalyst (Catalyst B).

Example 13

Example 13 contained a conventional TWC (Catalyst 1, CC1) and a zoned Rh/Ni/Cu catalyst (Catalyst C).

Example 14

Example 14 contained a conventional TWC (Catalyst 1, CC1) and a zoned Rh/Ni/Cu catalyst (Catalyst D).

Example 15

Example 14 contained a conventional TWC (Catalyst 1, CC1) and a zoned Rh/Ni catalyst (Catalyst E).

Figure 5A:
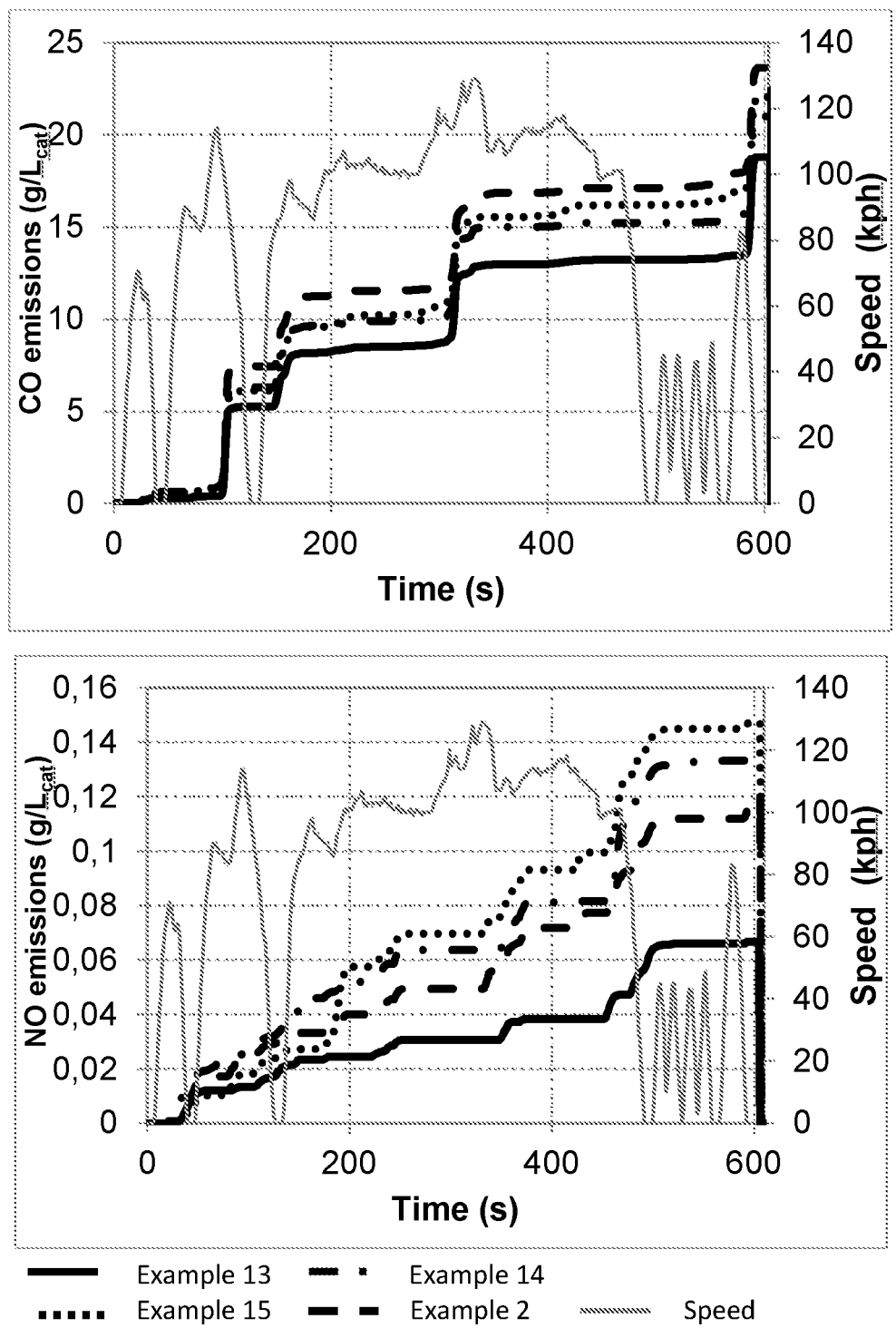
FIGS. 5A and 5B are line graphs showing comparative test results for cumulative CO emission, HC emission, NO emission and $NH_3$ of various catalyst materials.
Figure 5B:
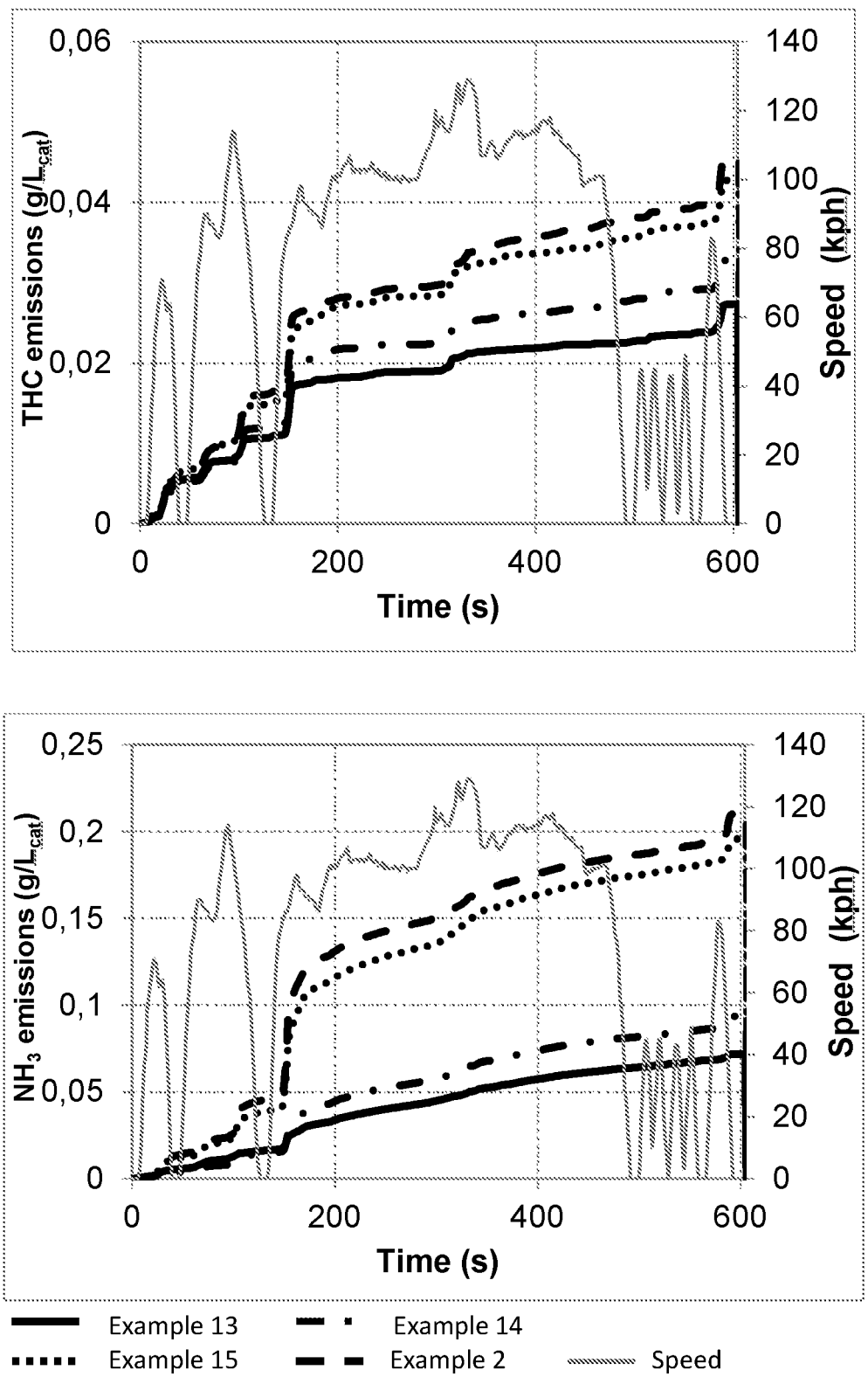

The examples 11 to 15 were tested for CO, NO, THC and $NH_3$ reduction. The results are shown in FIGS. 5A and 5B.

It is found that the exclusion of Cu causes reduction in catalyst efficacy. Further, the higher amount of Ni along with low amount of Cu causes lowering of emissions. Particularly, it is found that examples 12 (0.5% Cu and 8% Ni) and 13 show significant reduction of CO, NO, THC and $NH_3$ compared to the example 6. Example 12 shows CO, NO, THC and $NH_3$ reduction by 44%, 40%, 21% and 76%, respectively, compared to the example 6. Similarly, the example 13 shows CO, NO, THC and $NH_3$ reduction by 20%, 43%, 39% and 66%, respectively, compared to the example 6.

Reference throughout this specification to "one embodiment," "certain embodiments," "one or more embodiments" or "an embodiment" means that a particular feature, structure, material, or characteristic described in connection with the embodiment is included in at least one embodiment of the presently claimed invention. Thus, the appearances of the phrases such as "in one or more embodiments," "in certain embodiments," "in some embodiments," "in one embodiment," or "in an embodiment" in various places throughout this specification are not necessarily referring to the same embodiment of the presently claimed invention. Furthermore, the particular features, structures, materials, or characteristics may be combined in any suitable manner in one or more embodiments. All of the various embodiments, aspects, and options disclosed herein can be combined in all variations, regardless of whether such features or elements are expressly combined in a specific embodiment description herein. This presently claimed invention is intended to be read holistically such that any separable features or elements of the disclosed invention, in any of its various aspects and embodiments, should be viewed as intended to be combinable unless the context clearly dictates otherwise.

Although the embodiments disclosed herein have been described with reference to particular embodiments it is to be understood that these embodiments are merely illustrative of the principles and applications of the presently claimed invention. It will be apparent to those skilled in the art that various modifications and variations can be made to the methods and apparatus of the presently claimed invention without departing from the spirit and scope of the presently claimed invention. Thus, it is intended that the presently claimed invention include modifications and variations that are within the scope of the appended claims and their equivalents, and the above-described embodiments are presented for purposes of illustration and not of limitation.

The invention claimed is:

1. A catalytic article comprising:
    a) a first layer comprising a nickel component and a copper component supported on a ceria component, wherein the amount of the nickel component ranges from 0.1 wt. % to 30 wt. %, calculated as nickel oxide, based on the total weight of the first layer, and wherein the amount of the copper component ranges from 0.01 wt. % to 5.0 wt. % calculated as copper oxide, based on the total weight of the first layer;
    b) a second layer comprising a platinum group metal component supported on one or more of an oxygen storage component, an alumina component, and a zirconia component, wherein the platinum group metal component is chosen from platinum, rhodium, palladium, and any combination thereof, and wherein the amount of the platinum group metal component ranges from 0.01 wt. % to 5.0 wt. % based on the total weight of the second layer; and
    c) a substrate,
    wherein the first layer and the second layer are separated by a barrier layer, and the barrier layer comprises alumina and the amount of loading of alumina in the barrier layer ranges from 0.25 $g/in^3$ to 3.0 $g/in^3$.

2. The catalytic article according to claim 1, wherein the barrier layer further includes ceria, zirconia, ceria-zirconia composite, titania, and combinations thereof, wherein the barrier layer is substantially free from platinum group metals and non-PGM metals, and wherein the amount of each of the platinum group metals and non-PGM metals ranges from less than 0.001% w/w.

3. The catalytic article according to claim 1, wherein:
    the first layer is deposited as a bottom layer on a substrate;
    the barrier layer is deposited as a middle layer on the first layer; and
    the second layer is deposited as a top layer on the middle layer.

4. The catalytic article according to claim 2, wherein the amount of loading of alumina in the barrier layer ranges from 0.5 $g/in^3$ to 2.0 $g/in^3$.

5. The catalytic article according to claim 1, wherein the amount of the nickel component ranges from 5.0 wt. % to 15 wt. %, calculated as nickel oxide, based on the total weight of the first layer and the amount of the copper component ranges from 0.25 wt. % to 1.0 wt. %, based on the total weight of the first layer.

6. The catalytic article according to claim 1, wherein the barrier layer further comprises a dopant for alumina chosen from barium, strontium, calcium, magnesium, and lanthanum.

7. The catalytic article according to claim 1, wherein the first layer further comprises a non-PGM metal chosen from manganese, vanadium, cobalt, tungsten, and molybdenum.

8. The catalytic article according to claim 1, wherein the nickel component comprises a water soluble or water insoluble nickel compound chosen from nickel nitrate, nickel acetate, nickel carbonate, nickel sulfate, nickel oxide and any combination thereof.

9. The catalytic article according to claim 1, wherein the copper component comprises a water soluble or water insoluble copper compound chosen from copper metal, copper oxide, copper hydroxide, copper acetate, copper nitrate, copper sulfate, copper carbonate, copper acetylacetonate and any combination thereof.

10. The catalytic article according to claim 1, wherein the ceria component comprises ceria having a specific surface area ranging from 15 m$^2$/g to 60 m$^2$/g after calcination at 950° C. for 12 hours in the air, and the amount of the ceria component ranges from 20 wt. % to 80 wt. % based on the total weight of the first layer.

11. The catalytic article according to claim 1, wherein the ceria component of the first layer further comprises a dopant chosen from zirconia, yttria, praseodymia, lanthana, neodymia, samaria, gadolinia, alumina, titania, baria, strontia, and combinations thereof, and wherein the amount of the dopant ranges from 1.0 wt. % to 20 wt. % based on the total weight of the ceria component.

12. The catalytic article according to claim 1, wherein the amount of the platinum group metal component in the second layer ranges from 0.02 wt. % to 1.0 wt. % based on the total weight of the second layer.

13. The catalytic article according to claim 1, wherein the oxygen storage component is chosen from ceria-zirconia, ceria-zirconia-lanthana, ceria-zirconia-yttria, ceria-zirconia-lanthana-yttria, ceria-zirconia-neodymia, ceria-zirconia-praseodymia, ceria-zirconia-lanthana-neodymia, ceria-zirconia-lanthana-praseodymia, ceria-zirconia-lanthana-neodymia-praseodymia, and any combination thereof, and wherein the amount of the oxygen storage component ranges from 20 wt. % to 80 wt. % based on the total weight of the second layer.

14. The catalytic article according to claim 1, wherein the alumina component is chosen from alumina, lanthana-alumina, ceria-alumina, ceria-zirconia-alumina, zirconia-alumina, lanthana-zirconia-alumina, baria-alumina, baria-lanthana-alumina, baria-lanthana-neodymia-alumina, and combinations thereof; and wherein the amount of the alumina component ranges from 10 wt. % to 80 wt. % based on the total weight of the second layer.

15. The catalytic article according to claim 14, wherein the ceria content of the oxygen storage component in the second layer ranges from 5.0 wt. % to 50 wt. % based on the total weight of the oxygen storage component.

16. The catalytic article according to claim 1, wherein the substrate is chosen from ceramic substrate, metal substrate, ceramic foam substrate, polymer foam substrate, and woven fibre substrate.

17. The catalytic article according to claim 1, wherein at least one of the first and second layer comprises a first zone or a second zone, and wherein the first or second zone covers from 30% to 90% of the length of the substrate.

18. The catalytic article according to claim 1, wherein the first or the second layer is deposited as a top layer or bottom layer on the substrate.

19. A process for the preparation of a catalytic article according to claim 1, comprising:
preparing a first layer slurry;
depositing the first layer slurry on a substrate to obtain a first layer;
preparing a barrier layer slurry and depositing the barrier layer slurry as a middle layer on the first layer;
preparing a second layer slurry; and
depositing the second layer slurry on the middle layer to obtain a second layer followed by calcination at a temperature ranging from 400° C. to 700° C.,
wherein the step of preparing the first layer slurry or second layer slurry comprises a technique chosen from incipient wetness impregnation, incipient wetness co-impregnation, and post-addition.

20. A process for the preparation of a catalytic article according to claim 1, comprising:
preparing a first layer slurry;
depositing the first layer slurry on a substrate as a second zone to obtain a first layer;
preparing a second layer slurry; and
depositing the second layer slurry on the substrate as a first zone to obtain a second layer, followed by calcination at a temperature ranging from 400° C. to 700° C.,
wherein the first layer and the second layer are separated by a gap ranging from 1 mm to 10 mm on the substrate, and wherein the step of preparing the first layer slurry or second layer slurry comprises a technique chosen from incipient wetness impregnation, incipient wetness co-impregnation, and post-addition.

21. An exhaust system for internal combustion engines comprising i) a catalytic article according to claim 1; and ii) optionally, a platinum group metal based three-way conversion (TWC) catalytic article comprising from 1 g/ft$^3$ to 300 g/ft$^3$ of a platinum group metal chosen from platinum, palladium, rhodium, and combination thereof.

22. The exhaust system according to claim 21, wherein the system comprises a platinum group metal based three-way conversion (TWC) catalytic article and a catalytic article according to claim 1, and wherein the platinum group metal based three-way conversion (TWC) catalytic article is positioned downstream from an internal combustion engine and the catalytic article is positioned downstream in fluid communication with the platinum group metal based three-way conversion (TWC) catalytic article.

23. The exhaust system according to claim 21, wherein the system comprises a platinum group metal based three-way conversion (TWC) catalytic article and a catalytic article according to claim 1, and wherein the catalytic article is positioned downstream from an internal combustion engine and the platinum group metal based three-way conversion (TWC) catalytic article is positioned downstream in fluid communication with the three-way conversion (TWC) catalytic article.

24. A method for reducing hydrocarbons, carbon monoxide, and nitrogen oxide levels in a gaseous exhaust stream comprising:
contacting the gaseous exhaust stream with a catalytic article according to claim 1 to reduce the levels of hydrocarbons, carbon monoxide, and nitrogen oxide in the exhaust gas.

* * * * *